Patented Nov. 21, 1944

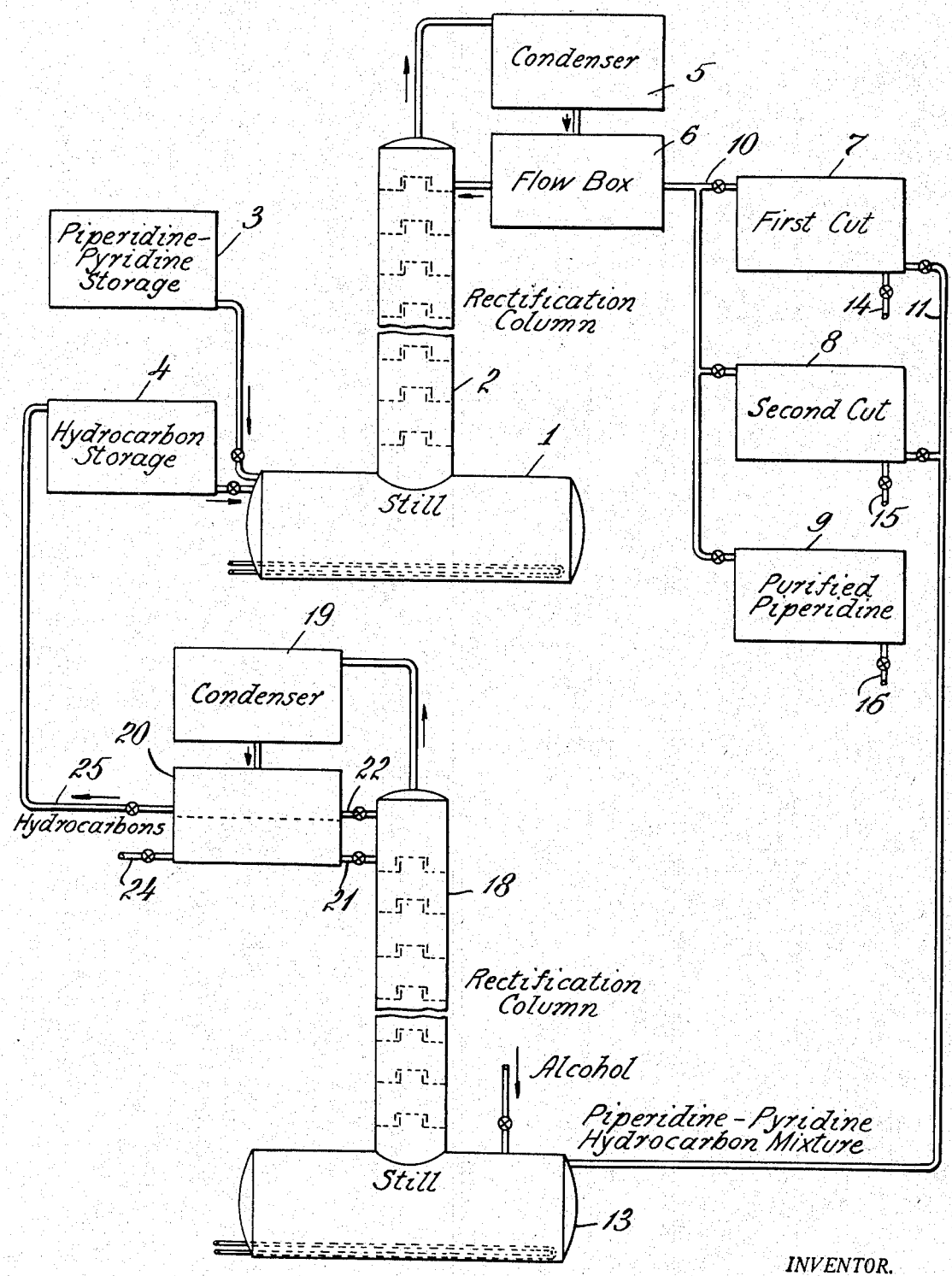

2,363,159

UNITED STATES PATENT OFFICE 2,363,159

PURIFICATION OF PIPERIDINE

Karl Henry Engel, Teaneck, N. J., assignor to Allied Chemical & Dye Corporation, New York, N. Y., a corporation of New York Application May 8, 1943, Serial No. 486,255

18 Claims. (Cl. 202—42)

This invention relates to the separation of piperidine from pyridine and more particularly to a distillation process for the purification of piperidine present in piperidine-pyridine mixtures.

In the production of piperidine by hydrogenation of pyridine, reaction mixtures constituted predominantly of piperidine and containing substantial proportions, e. g., 5 to 20 per cent by weight of pyridine and small amounts of aliphatic amines such as amylamine are ordinarily obtained. While pure piperidine boils at about 105.8° C. and pure pyridine boils at about 115.3° C., complete separation of these materials cannot be accomplished by ordinary fractional distillation because they form a constant-boiling mixture containing not over about 92 per cent by weight of piperidine and at least 8 per cent of pyridine and boiling at about 106.1° C. at atmospheric pressure (760 mm. of mercury). Hence, piperidine substantially free from pyridine cannot be obtained by conventional fractional distillation of piperidine-pyridine mixtures.

It is an object of this invention to provide a distillation process for the recovery of relatively pure piperidine from mixtures containing piperidine and pyridine.

It is a further object of the invention to provide a process of azeotropically distilling piperidine-pyridine mixtures in the presence of azeotropic agents which are particularly effective for separating the pyridine from the piperidine and of recovering the agents for reuse in the process. Other objects and advantages will appear hereinafter.

In accordance with the invention, mixtures containing piperidine and pyridine are fractionally distilled in the presence of non-aromatic hydrocarbons capable of forming azeotropic mixtures containing relatively high proportions of pyridine, which azeotropic mixtures boil below the boiling point of piperidine, particularly aliphatic and alicyclic hydrocarbons boiling within the range of 80° to 110° C., preferably 90° to 105° C. Distillation of piperidine-pyridine mixtures in the presence of such hydrocarbons yields hydrocarbon-piperidine-pyridine azeotropic distillates containing a higher proportion of pyridine than is present in the still charge, thereby leaving a residue enriched in piperidine. In order to recover the hydrocarbon and bases present in the azeotropic distillate, preferably at least the portion of the distillate of relatively high pyridine content is azeotropically distilled in the presence of an aliphatic monohydroxy alcohol containing not more than two carbon atoms, i. e., methanol or ethanol, to separate the hydrocarbon from the bases. The portion of the hydrocarbon-pyridine-piperidine azeotropic distillate relatively rich in piperidine may advantageously be mixed with a subsequent batch of piperidine-pyridine mixture for azeotropic distillation to separate the piperidine from the pyridine.

The fact that the hydrocarbon azeotropic agents employed in accordance with the invention form azeotropic mixtures containing relatively high ratios of pyridine to piperidine, which mixtures boil at temperatures below the boiling point of piperidine, permits progressive removal of pyridine as distillate leaving a residue enriched in piperidine.

Purification of piperidine in accordance with the invention may be effected to greatest advantage by azeotropic distillation of piperidine-pyridine mixtures containing from about 80 to 95 per cent of piperidine and 5 to 20 per cent of pyridine based on the weight of the mixture. By utilizing such mixtures high yields of piperidine of a purity of 98 per cent by weight or higher are readily obtained. When it is desired to purify mixtures containing more than about 20 per cent of pyridine, they are preferably non-azeotropically fractionally distilled to obtain fractions containing at least 80 per cent of piperidine prior to azeotropic distillation. Piperidine-pyridine mixtures containing materially less than 80 per cent piperidine and more than 20 per cent pyridine may also be azeotropically distilled in accordance with the invention to obtain piperidine of 95 to 98 per cent or higher purity. When mixtures of low piperidine content, say lower than 30 per cent based on the weight of the mixture, are azeotropically distilled, a large volume of azeotropic distillate must be taken off before a relatively small proportion of pure piperidine is obtained. An equal quantity of pure product can be obtained with considerable saving of distillation time, if such mixtures of low piperidine content are concentrated by non-azeotropic fractional distillation prior to an azeotropic distillation.

As the azeotropic agents, either substantially pure hydrocarbon compounds or hydrocarbon mixtures may be utilized. Suitable azeotropic agents include aliphatic saturated and unsaturated straight and branched-chain hydrocarbons, cycloparaffins and alicyclic unsaturated hydrocarbons, for example 3-methylhexane, n-heptane, di-isobutylene, cyclohexane, methylcyclohexane, 1,1-dimethylcyclopentane, 1,2-dimethylcyclopentane, 1,3-dimethylcyclopentane, cyclohexene, cyclohexadiene, methylcyclohexadiene and petroleum fractions constituted predominantly of paraffinic, olefinic or naphthenic compounds or mixtures thereof boiling within the desired boiling range. I prefer to employ aliphatic and napthenic hydrocarbons as azeotropic agents. At least a substantial proportion, preferably all, of the hydrocarbon azeotropic agent should boil within the range of from 80° to 110° C., preferably from 90° to 105° C. In general, the lower the boiling point of the hydrocarbon, the greater the amount required to effect separation as distillate of a given amount of pyridine so that hydrocarbons of unduly low boiling point are uneconomical azeotropic agents; on the other hand, hydrocarbons of higher boiling point than are distilled off during removal of the pyridine are difficult to remove from the piperidine. Hence, in preparing hydrocarbon fractions for use as the azeotropic agent, it is preferable to exclude from the fractions undue amounts of hydrocarbons boiling too low for economical separation of pyridine and hydrocarbons boiling too high for removal as distillate during removal of the pyridine. The use of narrow petroleum fractions boiling, e. g., at from 90° to 95° C. or 95° to 100° C. or 100° C. to 105° C., aids in maintaining relatively uniform conditions during the azeotropic distillation.

The accompanying drawing is a flow sheet illustrating diagrammatically an arrangement of conventional apparatus which may be employed in carrying out the invention.

In the drawing, reference numeral 1 designates a still equipped with a fractionating column 2, supplied with piperidine-pyridine mixture from tank 4. Condenser 5 discharges into flow box 6, arranged to return any desired proportion of the condensed distillate to column 2 as reflux and deliver the remainder to receiver 7, 8 or 9 through the valved conduit system 10. Either or both of receivers 7 and 8 discharge through the valved conduit system 11 to still 13 or may be emptied through valved outlets 14 and 15. Receiver 9 is provided with valved outlet 16. Still 13 is equipped with fractionating column 18 and condenser 19 discharging into a conventional separator 20 constructed to permit separation of distillate from the condenser into layers and return of any desired proportion of the layers to column 18 through valved pipes 21 and 22, the remainder of the layers being withdrawn through valved outlets 24 or 25. It will be observed that outlet 25 communicates with storage tank 4.

The invention may be carried out by introducing a mixture containing piperidine and from 5 to 20 per cent by weight of pyridine in still 1 together with a sufficient amount of the desired hydrocarbon azeotropic agent to separate the pyridine as azeotropic distillate leaving piperidine containing not more than two per cent of pyridine as still residue. The mixture may advantageously be fractionally distilled to remove high-boiling bases such as dipiperidyls and, if the piperidine content is low, to raise the same to, say, about 92 per cent prior to azeotropic distillation in accordance with the invention. During the azeotropic distillation, distillate vapors are condensed in condenser 5 and are discharged into flow box 6 which may be set to return any desired proportion of the condensate to column 2 as reflux. A cut of the distillate may be collected in receiver 7 until the ratio of pyridine to piperidine in the running distillate falls substantially, e. g., reaches 25:75 or 15:85, or falls below the ratio of pyridine to piperidine in the original still charge. A second cut may then be collected in receiver 8 until the hydrocarbon is exhausted from the still charge at which time the charge will contain less than about 2 per cent of pyridine if sufficient hydrocarbon was utilized. The purified piperidine may then be distilled off and collected in receiver 9. Ordinarily, it is advantageous to reintroduce the second cut into still 1 with a subsequent batch of piperidine-pyridine mixture to be purified.

The first cut, and the second cut also if desired, may be conducted through conduit system 11 to still 13 and fractionally distilled in the presence of aqueous or anhydrous ethanol or methanol. The alcohol and hydrocarbon form a low boiling azeotropic mixture which, after condensation in condenser 19, separates into a lower alcohol layer and an upper hydrocarbon layer in separator 20. The alcohol layer is continuously returned to the top of the column together with a sufficient proportion of the hydrocarbon layer to maintain the desired equilibrium conditions in the column and the remainder of the hydrocarbon layer containing small percentages of pyridine and alcohol is passed through conduit 25 to storage tank 4. The alcohol present in the hydrocarbon is distilled off first when azeotropic distillation is begun in still 1. When all of the hydrocarbon has been removed from still 13, the alcohol is distilled off and collected for re-use in removing hydrocarbon from a subsequent batch of azeotropic distillate from still 1. If desired, the piperidine-pyridine residue in still 13 may be fractionated by ordinary fractional distillation to obtain a fraction containing about 92 per cent piperidine and this fraction introduced into still 1 with a subsequent batch of piperidine-pyridine mixture. Alternatively, the residue from still 13 may be hydrogenated to increase the piperidine content thereof. Instead of distilling the azeotropic distillate from still 1 in the presence of alcohol, the piperidine and pyridine may be separated from the hydrocarbon by extracting the distillate with a mineral acid such as sulfuric acid and liberating the bases by treating the extract with caustic alkali.

The following examples are further illustrative of the invention:

*Example 1*

A reaction mixture obtained by hydrogenating pyridine was distilled to remove water and high boiling compounds such as dipiperidyls and 100 parts by volume of the resultant crude product containing about 89 per cent by weight of piperidine, 9.5 per cent by weight of pyridine and 1 per cent by weight of aliphatic amines calculated as amylamine were charged with 100 parts by volume of substantially pure di-isobutylene of 102.5° C. boiling point into a still equipped with a fractionating column having an efficiency equal to about 18 theoretical plates. The mixture was fractionally distilled returning about 90 per cent of the distillate to the column as reflux until substantially all of the di-isobutylene had been distilled off as an azeotropic mixture containing piperidine and pyridine. During the distillation, the vapor temperature in the fractionating column rose from about 98.6° C. to about 106.2° C. and the ratio of pyridine to piperidine in the distillate fell gradually from 63:37 to 1:99 (by weight). The running distillate contained about 70 per cent by volume of di-isobutylene until most of the hydrocarbon and pyridine had been removed from the still, after which the proportion of hydrocarbon in the distillate gradually diminished.

The residue remaining in the still was then distilled off and was found to contain about 98 per cent by weight of piperidine, .6 per cent by weight of pyridine and .5 per cent by weight of aliphatic amines calculated as amylamine. By adding the portion of the azeotropic distillate containing a ratio of piperidine to pyridine higher than 80 to 20 to the next batch of piperidine-pyridine mixture to be distilled, at least about 86.5 per cent of the piperidine is recoverable as piperidine of about 98 per cent purity. The yield may be further increased by separating the di-isobutylene from a portion or all of the remainder of the azeotropic distillate, e. g., by distillation in the presence of ethanol or methanol, which remove hydrocarbons as lower boiling azeotropic distillates, and subsequently distilling off from the residual piperidine-pyridine mixture a constant boiling mixture of piperidine and pyridine, and adding this constant boiling mixture to a subsequent batch of crude product for azeotropic distillation in the presence of di-isobutylene.

*Example 2*

1,000 parts by volume of a reaction mixture, obtained by hydrogenating pyridine, containing 87.4 per cent by weight of piperidine, 8.5 per cent of pyridine, 2.6 per cent of aliphatic amines calculated as amylamine, and 1.7 per cent of high boiling bases were charged with 500 parts by volume of substantially pure methylcyclohexane of 100° C. boiling point into a still similar to that employed in Example 1. The mixture was fractionally distilled while returning about 90 per cent of the distillate to the column as reflux until substantially all of the methylcyclohexane had been distilled off as azeotropic distillate containing piperidine. Data on the distillation are given in the following table:

| Fraction No. | Distillation range, °C. | Parts by volume in fraction | Volume ratio of hydrocarbon to bases in fraction | Analysis of fraction, percent by wt. | | | |
|---|---|---|---|---|---|---|---|
| | | | | Methylcyclohexane | Piperidine | Pyridine | Aliphatic amines |
| 1 | 93.9–98.1 | 140 | 73:27 | 69.5 | 5.5 | 15.6 | 7.0 |
| 2 | 98.1–98.3 | 140 | 73:27 | 69.5 | 14.7 | 13.9 | 0.9 |
| 3 | 98.3–99.2 | 140 | 73:27 | 70.0 | 20.9 | 8.4 | 0.5 |
| 4 | 99.2–99.3 | 177 | 69:31 | 66.2 | 25.2 | 5.8 | 0.5 |
| 5 | 99.3–105.4 | 194 | 57:43 | 52.7 | 40.6 | 3.7 | 0.7 |
| 6 | 105.4–107.0 | 603 | | None | 96.8 | 2.1 | 0.6 |

After removal of the methylcyclohexane, 603 parts by volume of piperidine of about 97 per cent purity containing about 2.1 per cent of pyridine and .6 per cent of aliphatic amines calculated as amylamine were distilled off, representing a yield of about 66 per cent by weight of the piperidine present in the original still charge. The still residue at this point was a mixture of piperidine and higher boiling bases from which additional piperidine could be recovered.

200 parts by volume of the above azeotropic distillate containing about 146 parts by volume of methylcyclohexane, 34 of piperidine, and 20 of pyridine were charged with 12 parts by volume of aqueous ethanol (94 per cent) into a still. The mixture was fractionally distilled, the distillate after condensation was separated into an upper layer containing the hydrocarbon and a lower layer containing the ethanol and the ethanol layer was continuously returned to the top of the fractionating column. About 50 per cent of the hydrocarbon layer was also continuously returned to the column to produce the desired equilibrium therein and the remainder of the hydrocarbon containing .15 per cent by weight of pyridine was withdrawn. When the hydrocarbon was exhausted from the still, the ethanol was distilled off and withdrawn leaving a still residue of 48 parts by volume containing about 50.8 per cent by weight of piperidine and 45.2 per cent of pyridine. The recovered methylcyclohexane may be used without purification for azeotropic distillation of subsequent batches of piperidine or may be treated, for example, with a mineral acid to extract the pyridine therefrom. The recovered alcohol contains small amounts of piperidine and pyridine and may be used in the recovery of additional methylcyclohexane from azeotropic distillates. If desired, methanol may be utilized instead of ethanol.

*Example 3*

About 170 parts by weight of methylcyclohexane and 100 parts by weight of a mixture containing about 68.3 per cent by weight of piperidine, 34.4 per cent of pyridine and 1.8 per cent of aliphatic amines calculated as amylamine were charged into a still equipped with a fractionating column and the mixture fractionated until the weight ratio of piperidine to pyridine in the running distillate reached 98:2. The distillation was then discontinued and it was found that the still residue contained 78.1 per cent by weight of piperidine, 1.8 per cent by weight of pyridine and 20 per cent by weight of methylcyclohexane. The piperidine may be readily separated from the methylcyclohexane by azeotropic distillation in the presence of methanol or ethanol as described in Example 2 leaving piperidine of more than 97 per cent purity.

*Example 4*

125 parts by volume of a petroleum distillate fraction boiling within the range of from 90.8 to 93.8° C. constituted of straight and branched-chain hydrocarbons were charged into a still similar to that employed in Example 1, together with 100 parts by volume of a mixture containing about 89 per cent by weight of piperidine, 9.5 per cent by weight of pyridine and 1 per cent by weight of aliphatic amines calculated as amylamine. The mixture was azeotropically distilled until the hydrocarbons were exhausted from the still and the still residue was then distilled off. Data on the distillation are given in the following table:

| Fraction No. | Distillation range, °C. | Parts by volume in total distillate | | Wt. ratio of hydrocarbon to base in distillate | Wt. ratio of piperidine to pyridine in distillate |
|---|---|---|---|---|---|
| | | Hydrocarbons | Bases | | |
| 1 | 86.7 | 4.7 | 0.3 | 92:8 | 10:90 |
| 2 | 89.4 | 9.2 | 0.8 | 88:12 | 4:96 |
| 3 | 90.0 | 18.2 | 1.8 | 86:14 | 1:99 |
| 4 | 90.1 | 27.1 | 2.9 | 86:14 | 3:97 |
| 5 | 90.2 | 36.0 | 4.0 | 86:14 | 6:94 |
| 6 | 90.3 | 45.0 | 5.0 | 88:12 | 4:96 |
| 7 | 90.4 | 54.1 | 5.9 | 87:13 | 6:94 |
| 8 | 90.7 | 63.4 | 6.6 | 90:10 | 16:84 |
| 9 | 91.0 | 72.7 | 7.3 | 91:9 | 25:75 |
| 10 | 91.2 | 82.0 | 8.0 | 92:8 | 25:75 |
| 11 | 91.7 | 91.5 | 8.5 | 92:8 | 42:58 |
| 12 | 94.3 | 100.0 | 10.0 | 92:8 | 65:35 |
| 13 | 98.0 | 109.0 | 11.0 | 81:19 | 90:10 |
| 14 | 101.2 | 116.2 | 13.8 | 70:30 | 97:3 |
| 15 | 106.0 | 122.0 | 18.0 | 16:84 | 99:1 |
| 16 | 106.5 | 0 | 70.0 | | 99:1 |

Fraction 16 was constituted of 70 parts by volume of piperidine of a purity of more than 98 per cent. Separation of the piperidine from the hydrocarbons in fractions Nos. 14 and 15 and addition of the separated piperidine to fraction No. 16, results in obtainment of about an 87 per cent yield of piperidine of 98 per cent or higher purity.

The hydrocarbons present in the azeotropic distillate may be recovered by distillation in the presence of aqueous ethanol or methanol as hereinabove described in Example 2. If desired, fractions 11 to 13 may be mixed with a succeeding batch of crude piperidine without separating the hydrocarbon.

*Example 5*

100 parts by volume of a mixture containing about 89 per cent of piperidine, 9.5 per cent of pyridine and 1 per cent of aliphatic amines calculated as amylamine were charged with 125 parts by volume of a petroleum distillate fraction boiling within the range of 100.5° to 103° C. constituted of straight-chain, branched-chain and naphthenic hydrocarbons, and the mixture fractionally distilled as described in Example 4. Practically the same yield of piperidine of substantially the same purity was obtained as in Example 4.

Use of hydrocarbon fractions boiling at from 96° to 98.8° C. and 90° to 98° C., respectively, which fractions were constituted of straight and branched-chain hydrocarbons resulted in about the same yields of piperidine of about the same purity as were obtained in Examples 4 and 5.

Thus it will be seen the invention provides a novel process of purifying piperidine present in piperidine-pyridine mixtures by azeotropic distillation in the presence of non-aromatic hydrocarbons which form with the pyridine azeotropic mixtures boiling substantially below the boiling point of piperidine and of recovering the hydrocarbons for reuse. While the above examples are of a batchwise method of effecting the distillation, it may be carried out, if desired, in a continuous manner.

Since certain changes may be made without departing from the scope of the invention, it is intended that the above shall be interpreted as illustrative and not in a limiting sense.

What is claimed is:

1. A process of separating piperidine from pyridine which comprises distilling a mixture containing piperidine and pyridine and rectifying the vapors evolved therefrom in the presence of non-aromatic hydrocarbon material boiling within the range of 80° to 110° C., thereby forming an azeotropic mixture containing a greater ratio of pyridine to piperidine than is present in said first-named mixture, said azeotropic mixture boiling below the boiling point of piperidine and being removed as distillate during said distillation, thereby leaving a residue enriched in piperidine.

2. A process of separating piperidine from pyridine which comprises fractionating vapors evolved from a mixture containing piperidine and from 5 to 70 per cent of pyridine, based on the combined weights of the piperidine and pyridine, in the presence of non-aromatic hydrocarbon material boiling within the range of from 80° to 110° C. capable of forming an azeotropic mixture containing a greater ratio of pyridine to piperidine than is present in said first named mixture, said azeotropic mixture boiling below the boiling point of piperidine thereby leaving a residue enriched in piperidine, said hydrocarbon material being substantially free from hydrocarbons which are not removable as distillate during removal of said azeotropic mixture containing pyridine.

3. A process of separating piperidine from pyridine which comprises fractionating vapors evolved from a mixture containing piperidine and from 5 to 20 per cent of pyridine, based on the combined weights of the piperidine and pyridine, in the presence of aliphatic hydrocarbon material boiling within the range of from 90° to 105° C. capable of forming an azeotropic mixture containing a greater ratio of pyridine to piperidine than is present in said first named mixture, said azeotropic mixture boiling below the boiling point of piperidine thereby leaving a residue enriched in piperidine.

4. A process of separating piperidine from pyridine which comprises fractionating vapors evolved from a mixture containing piperidine and from 5 to 20 per cent of pyridine, based on the combined weights of the piperidine and pyridine, in the presence of paraffinic hydrocarbon material boiling within the range of 90° to 105° C. which forms an azeotropic mixture containing a greater ratio of pyridine to piperidine than is present in said first named mixture, said azeotropic mixture boiling below the boiling point of piperidine thereby leaving a residue enriched in piperidine.

5. A process of separating piperidine from pyridine which comprises fractionating vapors evolved from a mixture containing piperidine and 5 to 20 per cent of pyridine, based on the combined weights of the piperidine and pyridine, in the presence of cyclo-paraffinic hydrocarbon material boiling within the range of 90° to 105° C. which forms an azeotropic mixture containing a greater ratio of pyridine to piperidine than is present in said first named mixture, said azeotropic mixture boiling below the boiling point of piperidine thereby leaving a residue enriched in piperidine.

6. A process of separating piperidine from pyridine which comprises fractionating vapors evolved from a mixture containing piperidine and 5 to 20 per cent of pyridine, based on the combined weights of the piperidine and pyridine, in the presence of olefinic hydrocarbon material boiling within the range of 90° to 105° C. which forms an azeotropic mixture containing a greater ratio of pyridine to piperidine than is present in said first named mixture, said azeotropic mixture boiling below the boiling point of piperidine thereby leaving a residue enriched in piperidine.

7. A process of separating piperidine from pyridine which comprises fractionating vapors evolved from a mixture containing piperidine and 5 to 20 per cent of pyridine, based on the combined weights of the piperidine and pyridine, in the presence of non-aromatic petroleum hydrocarbon distillate boiling within the range of 90° to 105° C. which forms an azeotropic mixture containing a greater ratio of pyridine to piperidine than is present in said first named mixture, said azeotropic mixture boiling below the boiling point of piperidine thereby leaving a residue enriched in piperidine, said hydrocarbon distillate being substantially free from hydrocarbons not removable as distillate during removal of said azeotropic mixture containing pyridine.

8. A process as specified by claim 5 in which the hydrocarbon material is methylcyclohexane.

9. A process as specified by claim 6 in which the hydrocarbon material is di-isobutylene.

10. A process of separating piperidine from pyridine which comprises distilling a mixture containing piperidine and pyridine in the presence of saturated non-aromatic hydrocarbon material boiling within the range of from 80° to 110° C., said hydrocarbon material forming an azeotropic mixture containing hydrocarbon and a greater ratio of pyridine to piperidine than is present in said first named mixture, said azeotropic mixture boiling below the boiling point of piperidine thereby leaving a residue enriched in piperidine, and distilling at least a portion of said azeotropic mixture in the presence of an aliphatic mono-hydroxy alcohol containing not more than 2 carbon atoms in the molecule to separate said hydrocarbon from the piperidine and pyridine.

11. A process of separating piperidine from pyridine which comprises distilling a mixture containing piperidine and pyridine in the presence of non-aromatic hydrocarbon material boiling within the range of 80° to 110° C., whereby an azeotropic piperidine-pyridine-hydrocarbon mixture is distilled off leaving a residue enriched in piperidine and distilling at least a portion of said azeotropic mixture in the presence of an aliphatic mono-hydroxy alcohol containing not more than 2 carbon atoms in the molecule to separate the hydrocarbon azeotropically from the piperidine and pyridine.

12. A process of separating piperidine from pyridine which comprises fractionating vapors evolved from a mixture containing piperidine and from 5 to 20 per cent of pyridine, based on the combined weights of the piperidine and pyridine, in the presence of non-aromatic hydrocarbon material boiling within the range of from 80° to 110° C. capable of forming an azeotropic mixture containing a greater ratio of pyridine to piperidine than is present in said first named mixture, said azeotropic mixture boiling below the boiling point of piperidine thereby leaving a residue enriched in piperidine, condensing said azeotropic mixture and distilling at least a portion of the condensate in the presence of aliphatic mono-hydroxy alcohol containing not more than 2 carbon atoms in the molecule to separate the hydrocarbon from the piperidine and pyridine.

13. A process of separating piperidine from mixtures containing, by weight, from 80 to 95 per cent of piperidine and 20 to 5 per cent of pyridine which comprises distilling said mixture in the presence of non-aromatic hydrocarbon material boiling within the range of 90° to 105° C. which forms an azeotropic distillate containing a greater ratio of pyridine to piperidine than is present in said first named mixture, said azeotropic distillate boiling below the boiling point of piperidine thereby leaving a residue enriched in piperidine, distilling a portion of said azeotropic distillate containing a relatively high ratio of piperidine to pyridine with a subsequent batch of said first named mixture, and distilling another portion of said azeotropic distillate containing a lower ratio of piperidine to pyridine in the presence of a mono-hydroxy aliphatic alcohol containing not more than 2 carbon atoms in the molecule to separate the hydrocarbon material from the pyridine and piperidine.

14. A process of separating pyridine from saturated non-aromatic hydrocarbons boiling within the range of from 80° to 110° C. which form constant boiling mixtures with the pyridine, which comprises distilling mixtures of the pyridine and said hydrocarbons in the presence of an aliphatic mono-hydroxy alcohol containing not more than 2 carbon atoms in the molecule.

15. A process of separating non-aromatic hydrocarbons boiling within the range of 80° to 110° C. from pyridine which comprises distilling mixtures of the hydrocarbons with pyridine and piperidine in the presence of an aliphatic mono-hydroxy alcohol containing not more than 2 carbon atoms in the molecule.

16. A process of separating piperidine and pyridine from mixtures thereof with non-aromatic hydrocarbons boiling within the range of 90° to 105° C. which form constant boiling mixtures with pyridine which comprises distilling said first named mixtures in the presence of an aliphatic mono-hydroxy alcohol containing not more than 2 carbon atoms in the molecule, condensing the distillate, separating the condensed distillate into an alcohol layer and a hydrocarbon layer and returning the alcohol layer to the distillation zone during removal of said hydrocarbon.

17. A process of separating piperidine from pyridine, which comprises fractionating vapors evolved from a mixture containing piperidine and from 5 to 70 per cent of pyridine based on the combined weight of the piperidine and pyridine in the presence of non-aromatic hydrocarbon material boiling within the range of 80° to 110° C.

18. A process of separating piperidine from piperidine-pyridine mixtures containing less than 80 per cent by weight of piperidine, which comprises non-azeotropically fractionally distilling the mixtures to obtain a mixture containing at least 80 per cent by weight of piperidine and not more than 20 per cent by weight of pyridine, distilling said last named mixture in the presence of non-aromatic hydrocarbon material boiling within the range of 80° to 110° C. capable of forming an azeotropic distillate containing a greater ratio of pyridine to piperidine than is present in said last named mixture, said azeotropic distillate boiling below the boiling point of piperidine, thereby leaving a residue enriched in piperidine.

KARL HENRY ENGEL.